United States Patent [19]

Lee

[11] Patent Number: 5,539,263
[45] Date of Patent: Jul. 23, 1996

[54] DIRECT CURRENT DRIVING VENTILATION FAN

[76] Inventor: Tzu-I Lee, 2F, No. 362, Ta Nan Road, Taipei City, Taiwan

[21] Appl. No.: 312,603

[22] Filed: Sep. 27, 1994

[51] Int. Cl.⁶ .................................................. H02K 7/00
[52] U.S. Cl. ......................... 310/67 R; 310/194; 310/62; 310/63; 416/155; 416/162
[58] Field of Search ............................... 310/67 R, 194, 310/179, DIG. 6, 62, 156, 63, 68 R, 90; 384/135, 397, 472; 165/87; 416/147, 155, 162

[56] References Cited

U.S. PATENT DOCUMENTS

| | | | |
|---|---|---|---|
| 5,170,086 | 12/1992 | Wrobel | 310/67 R |
| 5,270,604 | 12/1993 | Sandel | 310/194 |
| 5,363,003 | 11/1994 | Harada | 310/67 R |

*Primary Examiner*—R. Skudy
*Attorney, Agent, or Firm*—Brumbaugh, Graves, Donohue & Raymond

[57] ABSTRACT

A direct current fan has a base, a stator assembly fixed to the base, a spindle extending from said the stator assembly, and a blade assembly rotatably mounted to the spindle. The stator assembly includes a central axle and a bobbin having electrically conductive winding formed over the central axle. Pole plates alternately extend from diametrically opposed upper and lower disks which are mounted to the respective upper and lower ends of the central axle. Each said pole plate has first and second circumferential sections located at different distances from the central axis. The blade assembly includes a cylindrical member having blades mounted thereto and a circular central recessed portion. A hub is formed in the center of the recessed portion for receiving a portion of the spindle. The hub has an aperture in its center and a plurality of tabs equally spaced around the aperture. Each tab has an inner surface inclined toward the central axis, the angle of inclination being in a direction opposite the direction of rotation of the hub. A lubricant is placed between the spindle and the hub to enhance rotation of the blade assembly. A magnet is fit along the circumference of the central recessed portion. In operation, an electrical current is applied to the winding through the circuit board to alternate the magnetic polarity of the pole plates for continuously exerting a rotation force on the magnet, thereby forcing the blade assembly to rotate about the central axis.

19 Claims, 2 Drawing Sheets

DIRECT CURRENT DRIVING VENTILATION FAN

FIELD OF THE INVENTION

The present invention relates generally to a direct current (DC) driving fan.

BACKGROUND OF THE INVENTION

Ventilation fans are common to electronic devices, such as personal computers, photocopy machines, video cassette recorders, which generate heat during operation and require such heat to be removed to maintain an adequate working temperature. Conventionally, such ventilation fans are brushless direct current driving fans which comprise a central coil or winding, around which pole plates are disposed to be magnetized when electricity is supplied to the central coil through a circuit board. A fan blade assembly having a permanent magnet mounted thereon is rotatably supported on the central coil with the permanent magnet disposed around the pole plates in the close proximity thereof. The circuit board has a magnetic polarity sensing device for sensing the magnetic polarity of the permanent magnet of the blade assembly passing through a particular position and with the sensing result, the circuit board changes the magnetic polarities of the pole plates so as to have the pole plates maintained at suitable magnetic polarities for expelling the blade assembly to rotate about the central coil.

The conventional DC fan has several disadvantages. For example, once the DC fan is forcibly stopped by an external resistance which is larger than the expulsion generated between the pole plates and the permanent magnet, the DC fan will not resume rotation upon removal of the external resistance for the DC fan will stop at the location where the magnetic polarities of the permanent magnet oppose the pole plates having opposite magnetic polarities and is attracted thereby. Due to the uniform magnetic force distribution on the rotator of the DC fan, the DC fan will be in a force equilibrium state even after the external force is removed. This prevents the blades of the fan from rotating again once the resistance is removed. Under this situation, the fan has to be re-started or manually moved to overcome such attraction force between the fan permanent magnet and the pole plates and thus resume rotation.

Furthermore, in the conventional design, there is no lubrication sealing device so that the lubricant film which exists between the hub hole of the blade assembly and the axle on which the blade assembly is mounted and about which the blade assembly rotates may gradually leak out of the blade assembly and thus contaminate the DC fan.

SUMMARY OF THE INVENTION

It is an object of the present invention to provide a direct current driving fan wherein each of the pole plates comprises two sections having different distances from the rotational axis of the blade assembly which results in non-uniform distribution of the magnetic force acting on the rotator on which the pole plates are mounted so that the blade assembly may automatically resume rotation upon removal external resistance which stops the rotation of the blade assembly during the operation of the fan due to the fact that the fan is not in a force equilibrium condition resulted from the non-uniform force distribution.

It is an object of the present invention to provide a lubricant sealing device for a direction current driving fan which prevents the lubricant film on the rotational spindle from leaking out of and thus contaminating the fan.

In accordance with the present invention, there is provided a direction current driving fan comprising a recessed base, into which a stator assembly is fixed. A blade assembly, serving as a rotor, comprises a ring member with a plurality of blades mounted to its circumference and a magnet fixed inside the ring. The blade assembly is rotatably supported on a spindle extending from the stator assembly. The stator assembly comprises a bobbin on which electrically conductive windings are formed. A plurality of pole plates alternately extending from one end of the bobbin toward the other end are disposed around the windings, each pole plate being constituted by two sections located at different distances from a central axis of the windings. The ring member of the blade assembly has a central hub portion, having a central hole rotatably fit over the spindle, with a lubricant film existing therebetween, to support the blade assembly on the spindle. The hub hole has a plurality of tabs disposed around its opening, each tabs having an inclined inside surface which is so formed on the hub that when the blade assembly rotates about the central axis, the lubricant that flows out of the opening of the hub hole is prevented from leaking out of the blade assembly and forced back into the hub hole by the inclined surfaces of the tabs.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
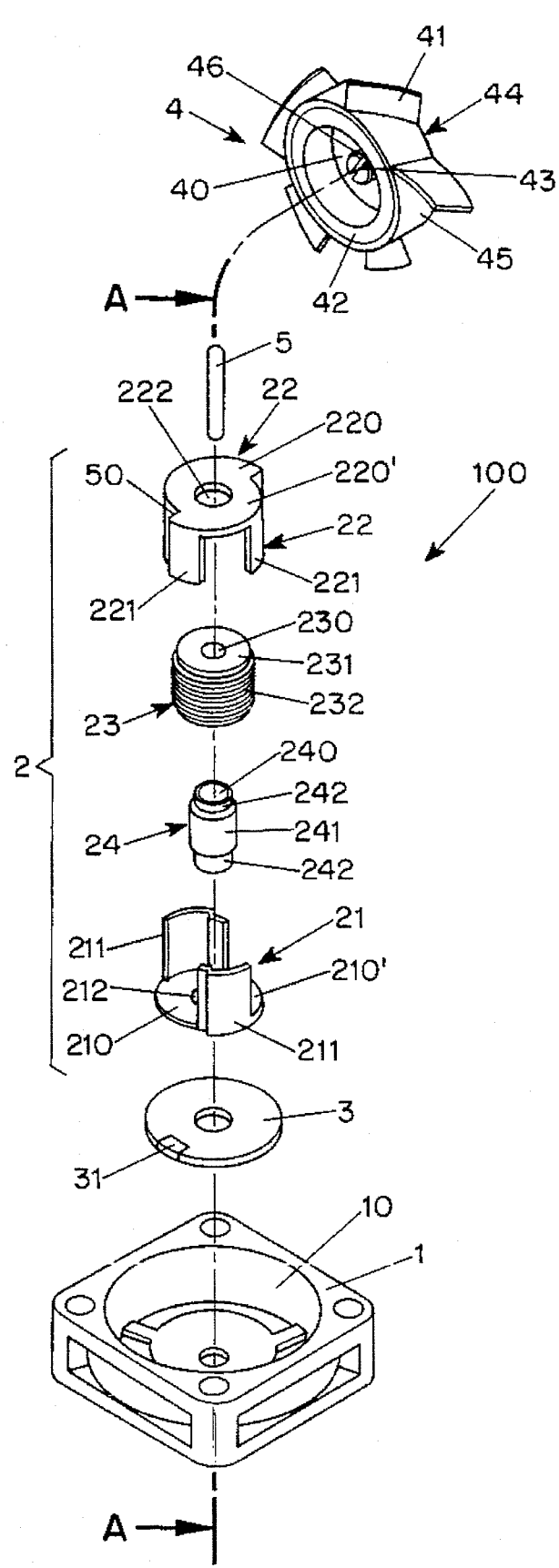
FIG. 1 is an exploded perspective view showing a direct current driving fan constructed in accordance with the present invention.
Figure 3:
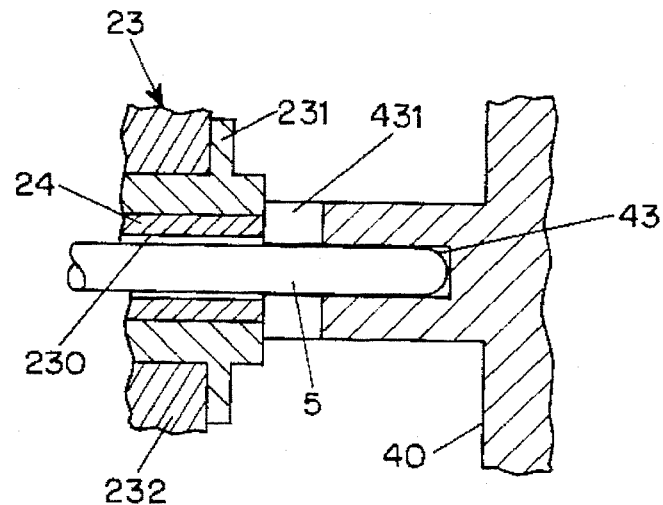
FIG. 3 is a partial cross-sectional view, showing the rotor hub mounted on the central spindle.

With reference to the drawings and in particular to FIG. 1, wherein a direct current (DC) driving ventilation fan constructed in accordance with the present invention, generally he reference numeral 100 is shown, the fan 100 comprises a base 1 having a recess 10 formed thereon to receive therein a stator 2. The stator 2 comprises a central coil 23 having a winding 232 surrounding around a bobbin member 231 (also see FIG. 3) along the axial length thereof. The bobbin 231 has a central axial hole 230 to be fit over an axle 24. The axle 24 comprises a cylindrical body 241 with two reduced axial end sections 242, each defining a circumferential shoulder with the body 241. The central coil 23 is fit over the cylindrical body 241 with the two reduced sections 242 substantially located outside the central coil 23.

The stator 2 further comprises a lower disk member 21 and an upper disk member 22 which are substantially identical. Each of the disk members 21 and 22 comprises two semi-circular sections 210, 210' or 220, 220' integrally formed together along a diameter to define a single piece member and the two semi-circular sections 210, 210' or 220,

220' are shifted relative to each other along the diameter to define a side extension or a tooth, such as 50 of the upper disk 22, on each of two opposite sides of the disk member 22 (or 21) along the diameter. As shown, each of the teeth 50 comprises a first circumferential section defined by one of semi-circles of the respective disk and a second circumferential section defined by the other one of semi-circles of the respective disk and a radial section connecting between the first and second circumferential sections and defined by the diameter.

Each of the disk members 21 and 22 comprises a central hole 212 or 222 which is smaller in size than the cylindrical body 241 of the axle 24, but larger than the reduced end sections 242 of the axle 24 so as to be fittable over the reduced sections 242 and supported by the shoulder defined by the reduced end sections 242.

Each of the disk members 21 and 22 comprises at least two pole plates 211 or 221 mounted thereto and extending therefrom toward the other one of the disk members. In the embodiment illustrated, each of the disk members 21 and 22 comprises two pole plates 211 or 221. Each of the pole plates 211 and 221 has a height substantially equal to the axial length of the central coil 23 and occupies substantially a quarter of a circle in circumferential direction, as shown in FIG. 4.

Figure 4:
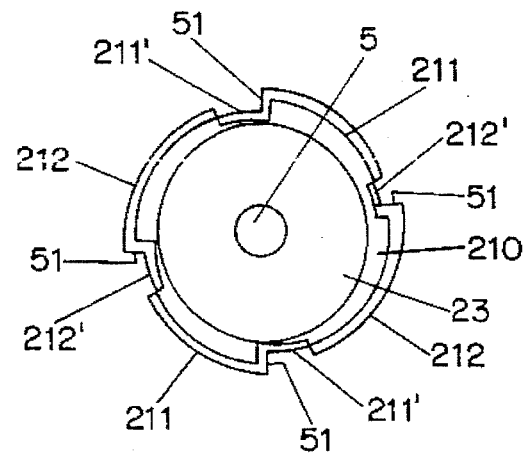
FIG. 4 is an end view, showing the stator assembly.

As shown in FIGS. 1 and 4, each of the pole plates 211 and 221 is located next to one of the side extensions 50 of the respective disk members 21 or 22 and comprises a secondary section 211' or 221' which is also located next to the teeth 50, but is opposite to the respective pole plate 211 or 221 with respect to the teeth 50 with a connection piece 51 connected between the pole plate and the respective secondary section so that each of the pole plates 211 and 221 comprises two sections located at different distances from the central axis A of the central coil 23. Such a noncontinuous structure of the pole plates results in non-uniform force distribution thereon so as to eliminate the problem of the prior art in that the fan will resume rotation by being not in a force equilibrium condition resulted from the non-uniform force distribution.

As is known to those skilled in the art, the stator 2 further comprises a circuit board 3 which serves to alternately supply direction current along different directions through the winding 232 of the central coil 23 so as to generate magnetic flux of different directions on the pole plates 221 and 211 in an alternate manner. This is well known and thus need not be discussed further.

A spindle 5 is fit into the central hole 230 of the bobbin 231 with an end thereof extending out of the central hole 230 to rotatably support a blade assembly 4, which serves as a rotor.

The blade assembly 4 comprises a cylindrical member 44 having one end closed and an opposite end opened to define therein a circular recess 40 with a hub 46 concentrically formed therein. The cylindrical member 44 comprises a cylindrical circumferential surface 45 and the blade assembly 4 comprises a plurality of blade plates 41 mounted to the circumferential surface 45. Ring-like magnet means 42 is snugly fit into the circular recess 40 to be fixed therein concentrically with the central hub 46.

The hub 46 comprises a central hole 43 to rotatably fit over the spindle 5 with a lubricant film (not explicitly shown in the drawings) existing between spindle 5 and the central hole 43 for enhancing the rotation of the blade assembly 4 relative to the spindle 5.

With such an arrangement, by applying electrical current to the winding 232 through the circuit board 3, the magnetic polarities of the pole plates 221 and 211 are changed alternately and thus continuously exert an expulsion to the magnet means 42 to force the blade assembly 4 to rotate about the spindle 5 with the lubricated contact engagement between the hub hole 34 and the spindle 5.

Figure 2:
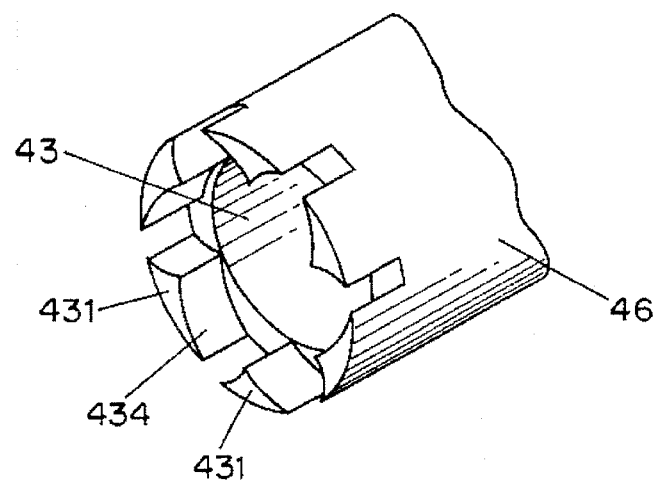
FIG. 2 is a perspective view of the rotor hub, showing in detail the lubricant sealing means of the present invention.

With further reference to FIG. 2, the hub 46 comprises a plurality of tabs 431 equally spaced around the opening of the hub central hole 43, serving as means for preventing the lubricant from gradually flowing out of the central hole 43 during rotation of the blade assembly 4. Each of the tabs 431 comprises an inclined surface 434, preferably curved, facing inward. The surface 434 are so inclined inward in a direction opposite to the rotation direction of the hub 46 that when the lubricant intends to flow out of the hub hole 43 during rotation, the inclined surface 434 functions to force the lubricant back into the hub hole 43 by the inclination and the rotation of the tab 431.

It is apparent that although the invention has been described in connection with the preferred embodiment, it is contemplated that those skilled in the art may make changes to the preferred embodiment without departing from the scope of the invention as defined in the appended claims.

What is claimed is:

1. A direct current fan comprising:
   a base;
   a stator assembly fixed in said base, said stator assembly comprising:
      a central axle having its axial length aligned with a central axis,
      a bobbin formed over said central axle having electrically conductive winding formed thereon,
      a plurality of pole plates alternately extending from diametrically opposed upper and lower disks mounted to respective upper and lower ends of said central axle, each said pole plate having first and second circumferential sections located at different distances from said central axis;
   a blade assembly for rotating around said central axis comprising:
      a cylindrical member having a plurality of blades mounted thereto and a substantially circular central recessed portion, and
      magnetic means fit into said central recessed portion;
   a spindle fixed to and extending from said bobbin for rotatably supporting said blade assembly; and
   a circuit board concentrically mounted to said axle, wherein an electrical current is applied to said winding through said circuit board to alternate magnetic polarity of said pole plates for continuously exerting an expulsion force on said magnetic means for forcing said blade assembly to rotate about said spindle, each said pole plate producing a non-uniform magnetic force on said magnetic means due to each said pole plate having first and second circumferential sections located at different distances from said central axis.

2. The direct current fan of claim 1, wherein each said disk comprises at least two said pole plates mounted thereto and extending therefrom toward said diametrically opposed disk.

3. The direct current fan of claim 2, wherein each said pole plate forms approximately one-quarter of a circle formed by said pole plates.

4. The direct current fan of claim 3, wherein each said pole plate is interconnected with adjacent pole plates extending from its said diametrically opposed disk.

5. The direct current fan of claim 4, wherein each said pole plate has a height substantially equal to an axial length of said bobbin.

6. The direct current fan of claim 1, wherein each said disk comprises first and second semi-circular members integrally joined together along their respective diameters to form a tooth on each end of said disk.

7. The direct current fan of claim 6, wherein said first and second semi-circular members are shifted relative to one another along their respective diameters to form said tooth.

8. The direct current fan of claim 1, wherein said blade assembly further comprises a hub formed centrally of said recessed portion for receiving a portion of said spindle, said hub having an aperture in the center thereof and a plurality of tabs equally spaced around said aperture, each said tab having an inner surface inclined toward said central axis.

9. The direct current fan of claim 8, wherein a lubricant is placed between said spindle and said hub for enhancing rotation of said blade assembly.

10. The direct current fan of claim 8, wherein each said inclined inner surface is inclined in a direction opposite the direction of rotation of said hub for preventing lubricant from flowing out of said hub during rotation of said blade assembly.

11. The direct current fan of claim 8, wherein said magnetic means is concentric with said central hub.

12. The direct current fan of claim 1, wherein said central axle comprises a cylindrical body with two reduced axial end sections, each said end section defining a shoulder on said cylindrical body.

13. The direct current fan of claim 12, wherein said bobbin is fit over said cylindrical body with said two reduced end sections being substantially located outside said bobbin.

14. A fan blade assembly for rotating on a spindle comprising:
   a cylindrical member having a plurality of blades mounted thereto and a central recessed portion; and
   a hub formed in a center of said recessed portion for accepting a portion of said spindle, said hub having a central aperture and a plurality of tabs equally spaced around said aperture, each said tab having an inner surface inclined toward a central axis for preventing lubricant from flowing out of said hub during rotation of said blade assembly.

15. The fan blade assembly of claim 14, further comprising magnetic means fit into said central recessed portion.

16. The fan blade assembly of claim 15, wherein said magnetic means is concentric with said central hub.

17. A direct current fan comprising:
   a base;
   a stator assembly fixed in said base, said stator assembly comprising:
      a central axle having its axial length aligned with a central axis, said axle comprising a cylindrical body having two reduced axial end sections, each said end section defining a shoulder on said cylindrical body,
      a bobbin formed over said central axle, said bobbin being fit over said cylindrical body with said two reduced end sections being substantially located outside said bobbin member, said bobbin having electrically conductive winding formed thereon, and
      a plurality of pole plates alternately extending from diametrically opposed upper and lower disks mounted to respective upper and lower ends of said central axle, each said pole plate having first and second circumferential sections located at different distances from said central axis;
   a spindle fixed to and extending from said bobbin;
   a blade assembly rotatably mounted to said spindle for rotating around said central axis comprising:
      a cylindrical member having a plurality of blades mounted thereto and a substantially circular central recessed portion,
      a hub formed centrally of said recessed portion for accepting a portion of said spindle, said hub having a central aperture and a plurality of tabs equally spaced around said aperture, each said tab having an inner surface inclined toward said central axis, a lubricant being placed between said spindle and said hub for enhancing rotation of said blade assembly, said inner surface being inclined in a direction opposite the direction of rotation of said hub, and
      magnetic means fit in said central recessed portion; and
   a circuit board concentrically mounted to said axle, wherein an electrical current is applied to said winding through said circuit board to alternate the magnetic polarity of said pole plates for continuously exerting an expulsion force on said magnetic means for forcing said blade assembly to rotate about said spindle, each said pole plate producing a non-uniform magnetic force on said magnetic means due to each said pole plate having first and second circumferential sections located at different distances from said central axis.

18. The direct current fan of claim 17, wherein each said upper and lower disk comprises at least two pole plates mounted thereto and extending therefrom toward the other of said diametrically opposed disks, each said pole plate having a height substantially equal to the axial length of said bobbin and being interconnected with adjacent pole plates extending from its said diametrically opposed disk, each said pole plate forming approximately one-quarter of a circle formed by said pole plates.

19. The direct current fan of claim 18, wherein each said diametrically opposed disk comprises first and second semi-circular members integrally joined together along their respective diameters to form a tooth on each end of said disk, said first and second semi-circular members being shifted relative to one another along their respective diameters to form said tooth.

* * * * *